United States Patent [19]

McElfresh

[11] Patent Number: 4,618,160
[45] Date of Patent: Oct. 21, 1986

[54] RECUMBENT VEHICLE

[76] Inventor: Lloyd McElfresh, 8706 Gross Point Rd., Skokie, Cook County, Ill. 60077

[21] Appl. No.: 707,453

[22] Filed: Mar. 1, 1985

[51] Int. Cl.⁴ ............................ B62M 1/02; B62K 3/00
[52] U.S. Cl. ............................... 280/281 LP; 280/261; 280/279; 474/146
[58] Field of Search ................. 280/281 LP, 282, 259, 280/260, 261, 279; 474/144, 146, 147

[56] References Cited

U.S. PATENT DOCUMENTS

| 3,753,577 | 8/1983 | Robinson | 280/261 |
| 3,921,467 | 11/1975 | Matsuura | 74/219 |
| 4,198,072 | 4/1980 | Hopkins | 280/267 |
| 4,279,429 | 7/1981 | Hopkins et al. | 280/267 |
| 4,283,070 | 8/1981 | Forrestall et al. | 280/274 |
| 4,333,664 | 6/1982 | Turner et al. | 280/261 |

FOREIGN PATENT DOCUMENTS

| 680974 | 8/1939 | Fed. Rep. of Germany | 280/260 |
| 7404229 | 9/1975 | Netherlands | 280/281 LP |

OTHER PUBLICATIONS

Gross, et al., "The Aerodynamics of Human-Powered Land Vehicles" *Scientific American* 24916: 142-152 (Dec., 1983).
Ninth Annual International Human Powered Speed Championships Sep. 30–Oct. 2, 1983, Indianapolis, program.
10th Annual International Human Powered Speed Championships Sep. 27–30, 1984, Indianapolis, program.
J. Holshua "Pedal Power: High Speeds Achieved", New York Times, Feb. 28, 1984, pp. 19–20.

*Primary Examiner*—John J. Love
*Assistant Examiner*—Charles R. Watts
*Attorney, Agent, or Firm*—Marshall, O'Toole, Gerstein, Murray & Bicknell

[57] ABSTRACT

A recumbent vehicle having a frame which includes an elongate tubular support adapted to substantially entirely enclose within its interior the vehicle's primary drive mechanism thereby eliminating risk of rider entanglement. Other features of recumbent vehicles according to the invention include a steering assembly including handlebars selectively positionable along the frame and diametrically interconnected by steering cable means to a front fork selectively positionable along the frame and rotatably supporting a front wheel providing for nearly 90° steering movement of the front wheel, and a seat selectively positionable along the frame to accommodate various size riders and adapted to support a rider without the need for complicated seat bracing apparatus.

19 Claims, 11 Drawing Figures

RECUMBENT VEHICLE

BACKGROUND OF THE INVENTION

The present invention relates generally to land vehicles operable by a rider in a non-upright position and more specifically to recumbent pedalable vehicles.

Pedalable land vehicles such as conventional bicycles operated by a rider in an upright position are well known. Other versions of pedalable vehicles have also been reported wherein the rider operates the vehicle in a non-upright position. See, generally, Gross, et al., *Scientific American* 249/6:142-152 (December, 1983).

Of interest to the present invention are the following reports of pedalable vehicles wherein the rider is seated in a reclining or "recumbent" position: Turner, et al., U.S. Pat. No. 4,333,664; Hopkins, et al., U.S. Pat. No. 4,279,429; Hopkins, U.S. Pat. No. 4,198,072; Matsuura, U.S. Pat. No. 3,921,467; and Robinson, U.S. Pat. No. 3,753,577. Turner, et al. discloses a recumbent bicycle wherein the rider is seated in a reclining position and operates pedals located at the front end of the frame and steers the vehicle by moving a handlebar integrally attached to the front wheel. The bicycle frame comprises small diameter tube supports which support the crank assembly, front and rear wheels, bicycle seat and the bicycle chain drive interconnecting the crank assembly and rear wheel which chain drive runs along the exterior of the frame. The seat disclosed in Turner, et al. is a padded fiberglass shell supported by an intricate seat back support system to prevent torsion during pedaling. The Hopkins U.S. Pat No. 4,198,072 discloses a tricycle recumbent vehicle having a bicycle chain drive assembly located alongside the front portion of the frame interconnecting the crank assembly with the front wheel and a rear two-wheel steering carriage assembly allowing pivoting of the rear axle about two different axes. The seat 15 is provided in two sections, a hip support section and a back support section joined at a pivot allowing angular positioning of the back support, and is integral with the frame. Hopkins U.S. Pat. No. 4,279,429 discloses a tricycle-type recumbent vehicle having a steering control mechanism including hand grips integrally attached to the rear axle and a gimbal means that provides pivotal steering movement of the rear wheels about two axes. The tricycle has a bicycle chain drive located alongside the front portion of the frame interconnecting the front wheel with the crank assembly and a seat provided in two portions, a hip support portion and a back support portion. Matsuura U.S. Pat. No. 3,921,467 discloses a recumbent cycle chain drive assembly located along the longitudinal axis of the cycle. The disclosed tricycle recumbent vehicle drive chain includes a primary sprocket attached to the cycle pedal assembly and a final sprocket attached to the rear wheels' axle and tensioner sprockets therebetween which route the cycle chain below the cycle seat in the center of the open tricycle frame to attempt to prevent entanglement of the rider. The disclosed cycle drive also includes a partial chain guard located over part of the crank assembly sprocket and drive chain. Robinson U.S. Pat. No. 3,753,577 discloses a recumbent tricycle pedalable vehicle having the seat attached to the frame between the rear wheels and at a height below that of the rear wheels' axles. The steering assembly comprises a handlebar assembly connected to a sprocket interconnected by a chain to a sprocket connected to the front wheel. A dual chain drive assembly attached alongside the frame having two chains interconnecting a pedal assembly sprocket with the rear axle sprocket is also shown.

Also of interest to the present invention are reports of attempts to provide more efficient and aerodynamic pedalable vehicles. See, generally, Gross, et al. "The Aerodynamics of Human-Powered Land Vehicles", Scientific American Vol. 249, No. 6 (December, 1983) pp. 142-152. Reported vehicles therein included several varieties of recumbent bicycles (p. 148) having chain drive assemblies located alongside tubular frame structures. Steering assemblies employed include handlebars attached directly to the front wheel (Easy Racer, Schondorf All-Weather Vehicle) and handlebars mounted below the rider's seat (Avatar 2000). The Avatar handlebars are interconnected with the front fork by a tie rod attached to each handlebar and the front fork. Similar versions of aerodynamically designed recumbent vehicles have been reported by the International Human Powered Vehicle Association in its September, 1983 report of the Ninth Annual Human Powered Speed Championships. Included in the reported vehicles is the "Infinity" recumbent bicycle having a bicycle chain drive located alongside the tubular frame and a steering assembly including a handlebar assembly welded to rear portion of the frame at a fixed position and interconnected with the front wheel fork assembly by two cables, one cable interconnecting the left handlebar with the left side of the front fork and a right cable connecting the right handlebar with the right side of the front fork. The seat is welded to a slide attached to the rear of the frame near the point at which the handlebars are fixed to the frame and has two parallel side supports supporting a fabric hammock-type seat.

Of particular interest to the present invention is the fact that the reported recumbent bicycles all have chain drive asemblies located alongside the vehicle frame in close proximity to the rider's legs resulting in significant risk of entanglement of the rider with the chain. The reported recumbent vehicles have also been found to be difficult to maneuver at low speeds due to the limited turning capacity provided by the steering assemblies reported which do not provide more than about a 45° turn of the steering wheel to either side.

There exists, therefore, a need in the art for safer, more maneuverable recumbent vehicles adapted to readily accommodate a variety of different size riders.

BRIEF SUMMARY

The present invention provides novel improved recumbent pedalable vehicles having a frame comprising an elongate tubular support means adapted to substantially entirely enclose within its interior the vehicle's primary drive means thereby eliminating risk of rider entanglement. One presently preferred embodiment includes a vehicle adapted to be operated by a rider in a recumbent position including a frame having a front portion rotatably supporting a crank assembly having foot pedals, a front wheel support pivotably attached to the frame generally intermediate the front portion and rear portion of the frame and rotatably supporting a front wheel, a rear wheel rotatably supported by the rear portion of the frame including a rear axle rigidly supporting a rear sprocket, a seat supported by the frame generally intermediate the front wheel and rear wheel, wherein the improvement comprises a frame comprising an elongate tubular support means having a front portion rotatably supporting the crank assembly, a center portion supporting the seat, and a rear portion rotatably supporting the rear wheel, said elongate tubular support means being adapted to substantially entirely enclose within its interior a primary drive means comprising a crank sprocket means rigidly supported by said crank assembly and interconnected by a power transfer means to an inner drive sprocket means rigidly supported by a drive shaft means interconnected by a secondary drive means to said rear wheel. The front portion of the frame is adapted to rotatably support the crank assembly which comprises a crank shaft having a center sprocket means support portion, intermediate bearing support portions and outer crank support portions. The crank shaft is rotatably horizontally supported at intermediate bearing support portions by the front portion providing for rotatable support of the center sprocket means support portion within the front portion of the elongate tubular support at a position substantially horizontally perpendicular to the interior longitudinal axis of said elongate tubular support. The outer crank support portions of the crank shaft rigidly support bicycle cranks rotatably supporting bicycle foot pedals. The center crank sprocket means support portion of the crank shaft rigidly supports the crank sprocket of the primary drive means at a position inside the front portion of the elongate tubular support and in substantial longitudinal alignment with the longitudinal axis of the elongate tubular support. The rear portion of the elongate tubular support rotatably supports the drive shaft means having a center inner drive sprocket means support portion, intermediate bearing support portions and outer support portions. The drive shaft is rotatably horizontally supported by the rear portion of the frame by the bearing support portions providing for rotatable support of the center inner drive sprocket support means portion at a position inside the rear portion of the frame at a position substantially horizontally perpendicular to the longitudinal axis of the elongate tubular support and substantially parallel to the crank shaft means. One of the outer support portions of the drive shaft is interconnected by a secondary drive means to the rear wheel. The center inner drive sprocket support portion of the drive shaft rigidly supports the inner drive sprocket at a position inside the rear portion and in substantial longitudinal alignment with the longitudinal axis of the elongate tubular support. The crank sprocket and inner drive sprocket are interconnected by a power transfer means such as a chain at a position substantially entirely within the interior of said elongate tubular support providing for transfer of power supplied from rotation of the crank assembly from the crank sprocket to the inner drive sprocket and to said secondary drive means and to said rear wheel, thereby eliminating the risk of rider entanglement with the primary drive means.

A second important feature of the present invention includes recumbent vehicles having a steering assembly having handlebars selectively positionable along the frame and interconnected by two steering cables diametrically attached to the front fork providing for nearly 90° steering movement of the front wheel to either side and improving low speed maneuverability of the vehicle.

Another important feature of the present invention includes recumbent vehicles having a seat selectively positionable along the frame to accommodate various size riders wherein the seat comprises a seat backrest support rigidly supporting a seat backrest supporting a rear seat web support, seat side support portions supporting side seat web supports and a seat center support portion supporting a center seat web support and a seat web supported therein adapted to support a rider without the need for complicated seat back bracing apparatus.

Another important feature of the present invention includes recumbent vehicles having a combination of the above-described elongate tubular support means substantially entirely enclosing the primary drive means and having a steering assembly comprising a handlebar assembly selectively positionable along the frame and interconnected by two steering cables diametrically contacting the handlebar assembly and the front fork providing for nearly 90° steering movement of the front wheel to either side and improving low speed maneuverability of the vehicle.

Another important feature of the present invention includes recumbent vehicles having a combination of the above-described elongate tubular support means and steering assembly and having a seat selectively positionable along the frame adjacent the handlebars of the steering assembly wherein the seat comprises a seat backrest support rigidly supporting a seat backrest supporting a rear seat web support, seat side support portions supporting side seat web supports and a seat center support portion supporting a center seat web support and a seat web supported therein adapted to support a rider without the need for complicated seat back bracing apparatus thereby minimizing rider entanglement, providing for increased low speed maneuverability and providing for accommodation of riders of various sizes.

Numerous aspects and advantages of the present invention will become apparent upon consideration of the following detailed description along with the accompanying drawings.

DETAILED DESCRIPTION

Figure 1:
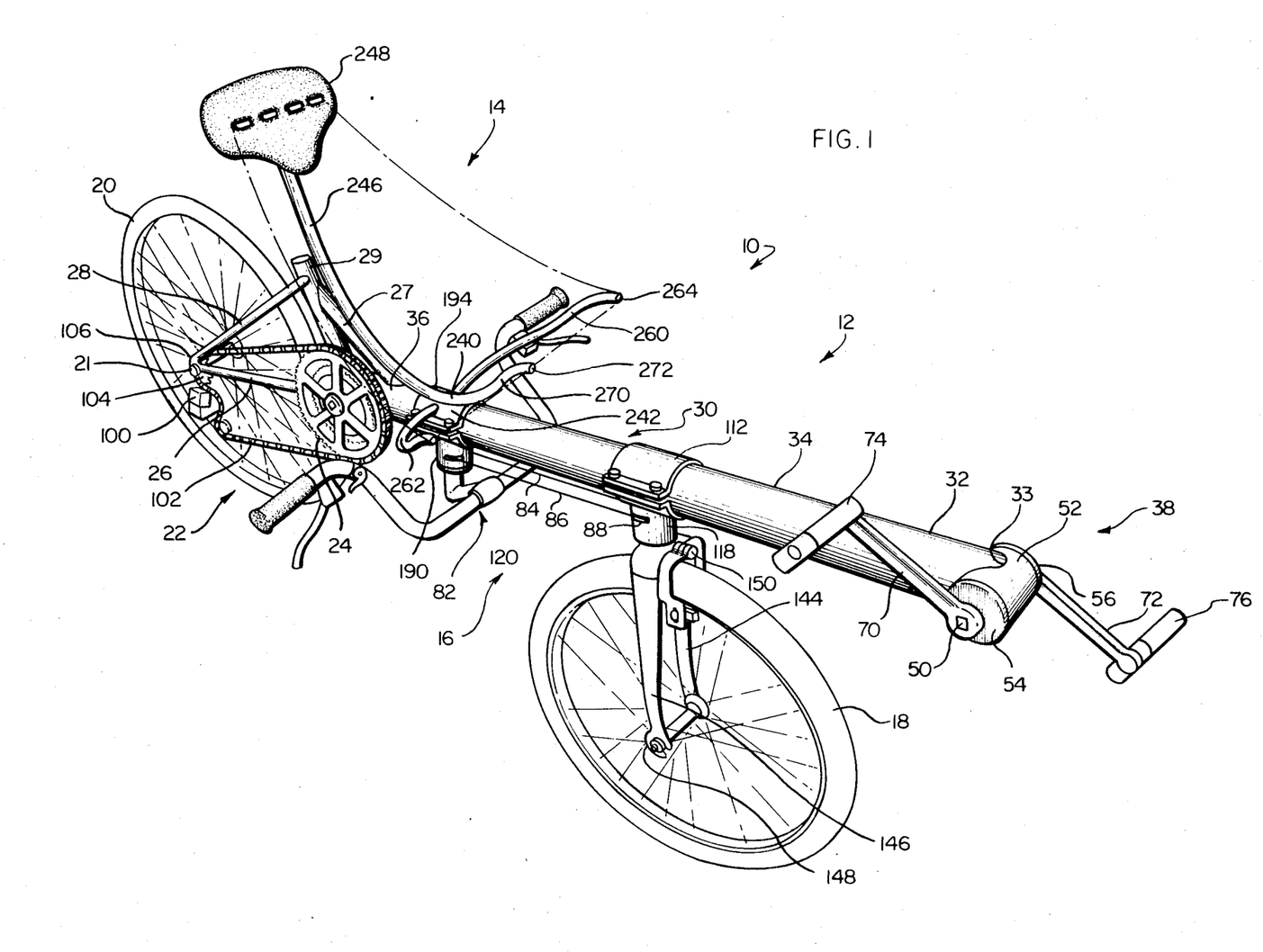
FIG. 1 is an elevated perspective view of one embodiment of a recumbent pedalable vehicle in accordance with the present invention.
Figure 2:
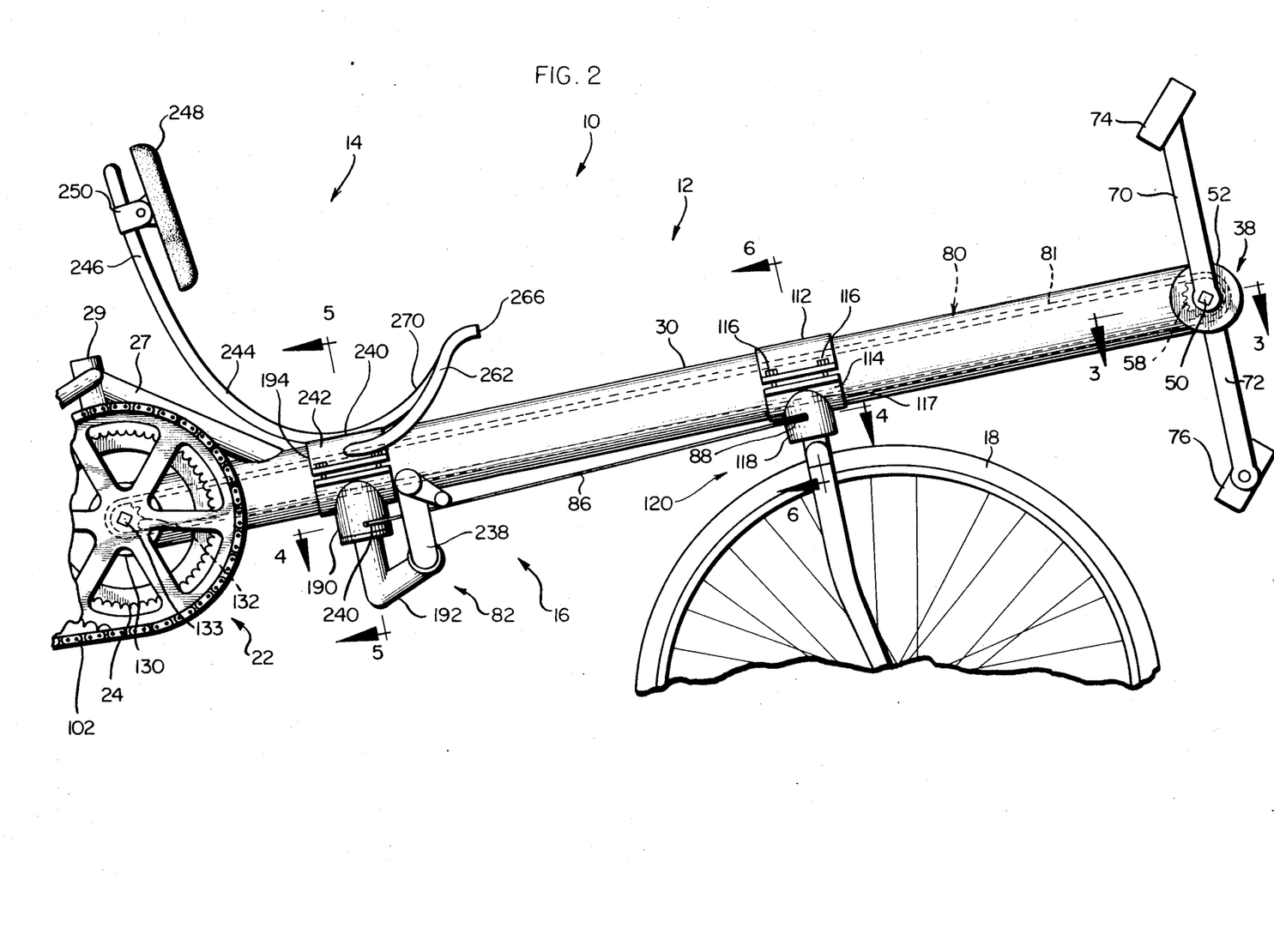
FIG. 2 is a fragmentary sectional side view of the recumbent pedalable vehicle of FIG. 1 taken along the longitudinal vertical axis of the frame.

Referring in detail to the drawings, and more particularly to FIGS. 1-2 of the drawings, according to the present invention there is provided a recumbent pedalable vehicle 10 comprising a frame 12 having an elongate tubular support portion 30 having a front portion 32 supporting a crank assembly 38, a center portion 34, a rear portion 36 supporting an outer drive sprocket 24 of a secondary drive means 22 comprising a conventional bicycle chain drive including a rear wheel 20 rotatably supported rear wheel stays 28 and chain stays 26 and conventional bicycle derailleur 100 mounted on one chain stay and engaging conventional bicycle chain 102 interconnecting outer drive sprocket 24 and rear sprocket 104 attached to rear wheel axle 21. Elongate tubular support 30 also supports seat 14 for a rider at a position intermediate outer drive sprocket 24 and crank assembly 38, and pivotably supports front wheel fork 120 at a position generally intermediate front portion 32 and rear portion 36 of the elongate tubular support means which front fork rotatably supports front wheel 18. Elongate tubular support portion 30 of frame 12 may be constructed of any suitable material providing adequate surfaces for supporting crank assembly 38, seat 14, front wheel fork 120 and secondary drive means 22 while providing adequate support for a rider when seated in seat 14 and capable of withstanding the stresses experienced in operation of the pedalable vehicle. The elongate tubular support is adapted to provide an adequate interior diameter to accommodate primary drive means 80 substantially entirely within its interior, the primary drive means shown here consisting of a chain 81 interconnecting crank sprocket 58 of crank assembly 38 with internal drive sprocket 132 attached to drive shaft 133 which also supports outer drive sprocket 24 of secondary drive means 22 best shown in FIG. 2. As a specific example illustrated here, elongate tubular support portion 30 consists of a 42 inch long section of 0.065 inch wall thickness tubular steel having a 2.5 inch outside diameter. It is contemplated that thinner lighter materials such as stainless steel, titanium or other strong lightweight tubular materials may also be employed if a more lightweight pedalable recumbent vehicle is desired.

Figure 3:
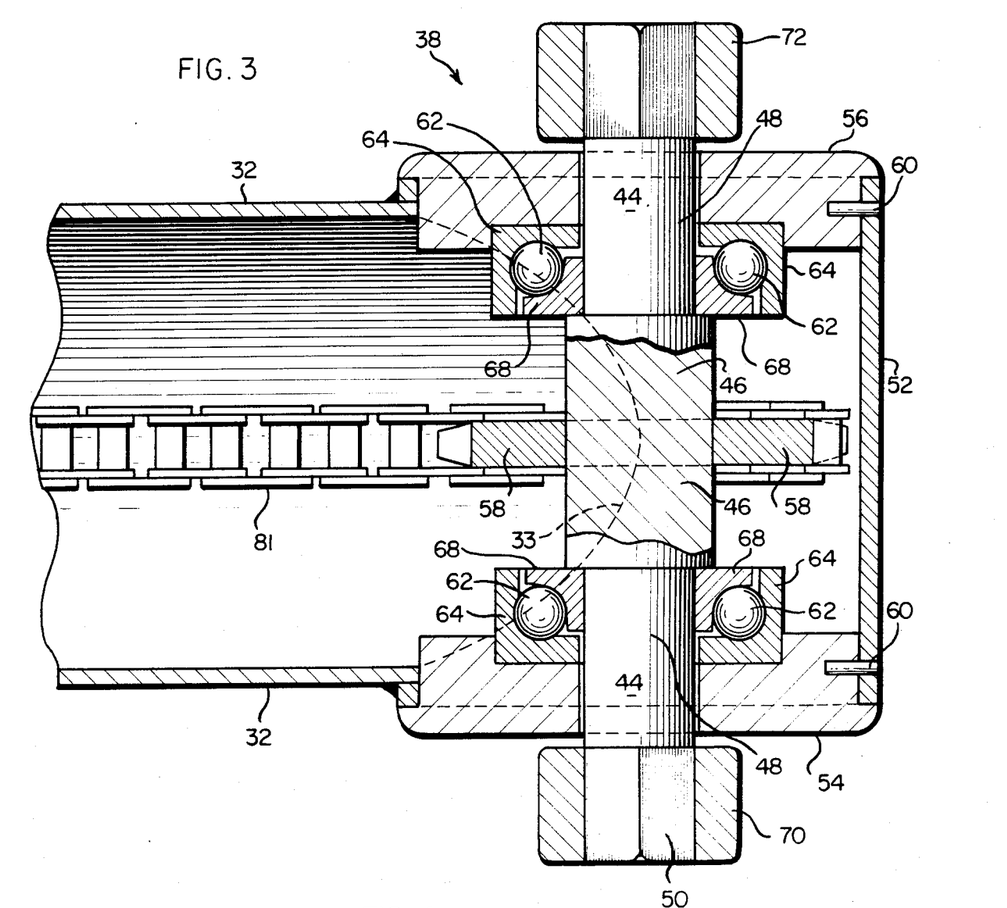
FIG. 3 is a fragmentary sectional view of the front portion of the frame and crank assembly taken along section line 3—3 of FIG. 2.
Figure 4:
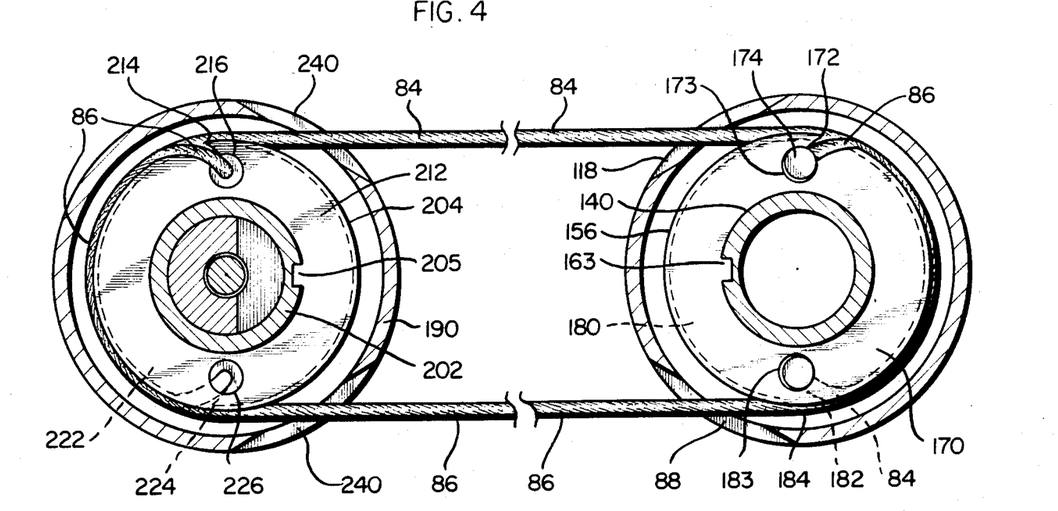
FIG. 4 is a fragmentary sectional view of the steering assembly taken along section line 4—4 of FIG. 2.
Figure 5:
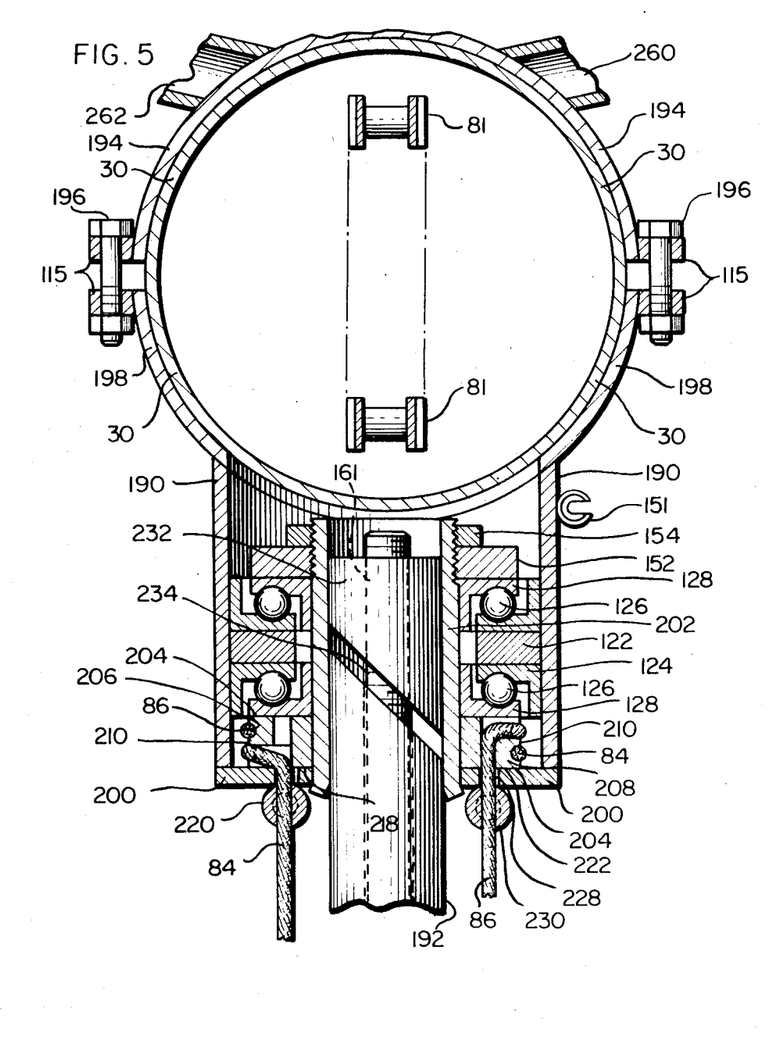
FIG. 5 is a fragmentary sectional view of the frame and handlebar steering assembly taken along section line 5—5 of FIG. 2.

Front portion 32 of elongate tubular support portion 30 is adapted to support crank assembly 38 and, as a specific example illustrated here best shown in FIGS. 1-3, consists of two 2.5 inch circular notches cut into the sides of the end of front portion 32 perpendicular to longitudinal axis of the elongate tubular support adapted to receive sprocket tube 52 of the crank assembly, it being understood that other shape supports may be provided at front portion 32 adapted to receive the configuration of the crank assembly employed. Sprocket tube 52, as a specific example illustrated here, consists of a 2.75 inch long section of 2.5 inch outside diameter tubular steel having a 0.065 inch wall thickness and square cut at the ends, to provide two substantially flat faces parallel to one another. As a specific example illustrated here, sprocket tube 52 has a hole milled in the center of one side to conform to the edges of the notches provided in front portion 32 to provide an intersection 33 with a weldable edge, is welded to the front portion to form the intersection allowing access to the crank sprocket positioned within the interior of the sprocket tube from the interior of the elongate tubular support.

Rear portion 36 of elongate tubular support portion 30 is adapted to rotatably support drive shaft 133. By way of a specific example illustrated here, rear portion 36 includes two 2.5 inch diameter circular notches cut into the sides of the end of the rear portion perpendicular to the longitudinal axis of the elongate tubular support and parallel to the notches provided in front portion 32 as described with respect to the front portion, above, adapted to receive an inner drive sprocket tube 130 consisting of a 2.75 inch section of 2.5 inch outside diameter tubular steel having a 0.065 inch wall thickness with square cut ends and a hole milled in one side to provide an intersection with a weldable edge. Inner drive sprocket tube 130 is welded to the rear portion to form the intersection at a position allowing access to the inner drive sprocket 132 positioned within the interior of the sprocket tube from the interior of the elongate tubular support as employed with respect to the crank sprocket tube. Although the illustrated drive shaft sprocket tube and crank sprocket tube, drive shaft and crank shaft shown here are basically identical in configuration in order to facilitate construction, it is understood that different configurations may be employed provided the crank shaft and drive shaft are adequately supported by the elongate tubular support and provided adequate access is maintained to the inner drive sprocket and crank sprocket from the interior of the elongate tubular support.

Rear portion 36 of elongate tubular support 30 is also adapted to rotatably support rear wheel 20. As illustrated here, the rear portion rigidly supports respective bicycle chain stays 26 and rear wheel stays 28. Chain stays 26 are attached by one end to the rear portion by welding or other suitable fastening means. The respective bicycle chain stays support at their other ends conventional rear wheels drop-outs 106 adapted to removably support the axle of rear bicycle wheel 20 having a rear wheel sprocket 104 attached thereto. Conventional wheel drop-outs are also supported by respective rear wheel stays 28 attached by one end to the drop-outs by welding or brazing, the other ends of the rear wheel stays being supported by rear wheel stay support 29 supported by rear portion 36 by being welded thereto. The rear wheel stay support may also be supported by brace 27 welded to the rear wheel stay support and the rear portion. A conventional bicycle derailleur 100 is attached to the chain stay on the outer drive sprocket side of the vehicle if a multiple-gear vehicle is desired.

Elongate tubular support 30 is adapted to receive and substantially entirely enclose primary drive means 80 which, as shown here, consists of power transfer means 81 interconnecting crank sprocket 58 of the crank assembly with inner drive sprocket 132 attached to drive shaft 133 rotatably supported within drive shaft sprocket tube 130. Power transfer means 81 shown here consists of a chain adapted to engage the crank sprocket and inner drive sprocket in a continuous loop and provides for the transfer of power from rotation of crank assembly 38 by the rider to crank sprocket 58 to the chain causing rotation of inner drive sprocket 132 and drive shaft 133. Drive shaft 133 is interconnected with secondary drive means 22 and transfers power from the power transfer means to the secondary drive means causing rotation of rear wheel 20. As shown here by way of a specific example, secondary drive means 22 consists of an outer drive sprocket 24 rigidly supported by one of the outer support portions of drive shaft 133 alongside rear portion 36 and interconnected by a continuous bicycle chain drive 102 to rear wheel sprocket 104. As illustrated here, power transfer means 81 consists of a chain, but may be replaced by a shaft means or other power transfer means capable of transferring the power generated from rotation of crank assembly 38 to the rear wheel through secondary drive means 22 or directly to rear wheel 20 if the rear wheel is attached directly to the drive shaft.

Crank assembly 38, as illustrated herein, consists of crank sprocket tube 52 having respective bearing caps 54 and 56 attached by fixing pins 60 to opposite parallel faces of the sprocket tube best shown in FIGS. 2–3. Bearing caps 54 and 56 rigidly support respective outer bearing races 64 which rotatably support bearings 62 rotatably supporting respective inner bearing races 68 attached to intermediate bearing support portions 48 of crank shaft 44, maintaining crank shaft in a position substantially horizontally perpendicular to the longitudinal axis of elongate tubular support 30. Center sprocket support portion 46 of crank shaft 44 rigidly supports crank sprocket 58 in substantial longitudinal alignment with the longitudinal axis of elongate tubular support 30 and providing for engagement of the crank sprocket with power transfer means 81. Respective outer portions 50 of crank shaft 44 extend outward from bearing caps 54 and 56 and are adapted to rigidly support conventional bicycle cranks 70 and 72 rotatably supporting foot pedals 74 and 76. As indicated above, inner drive sprocket tube 130 and drive shaft 133, are, as shown here, constructed in a manner identical to crank sprocket tube 52 and crank shaft 44, respectively. Inner drive sprocket 132 is rotatably supported by drive shaft 133 by the same bearing means employed in crank assembly 38 and the inner drive sprocket support portion is supported at a position within the inner drive sprocket tube in substantial vertical longitudinal alignment with crank sprocket 58. Drive shaft 133 is rotatably supported by respective bearing caps 131 similar to that employed in crank assembly 38 except that the drive shaft is supported eccentrically when a chain is employed as power transfer means 81 so that rotation of the bearing 131 caps tightens the chain power transfer means. One of the outer support portions of the drive shaft rigidly supports outer drive sprocket 24 of secondary drive means 22 according to the illustrated embodiment of the present invention. The other outer support portion of the drive shaft is available for attachment to small electric or gasoline engines or inertia storage devices if the pedalable recumbent vehicle is desired to be equipped with such features. The outer portions of the drive shaft may also support respective cranks of a bicycle crank assembly rotatably supporting pedals if a tandem vehicle is desired.

Figure 6:
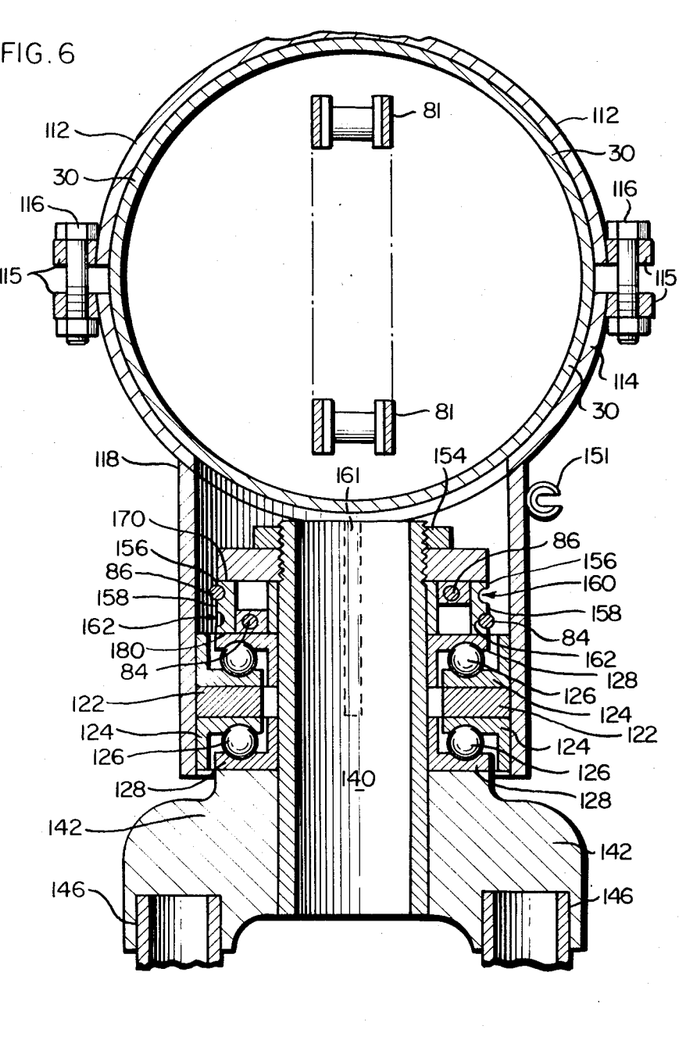
FIG. 6 is a fragmentary sectional view of the frame and front fork steering assembly taken along section line 6—6 of FIG. 2.

Front wheel fork 120 is supported by elongate tubular support means 30 generally intermediate crank assembly 38 and front sprocket 24, as is illustrated here best shown in FIGS. 1, 2 and 6, consists of an upper clamp 112 with an interior surface adapted to conform to the upper exterior surface of elongate frame support 30 and adjustably fastenable by fastening bolts 116 to a lower clamp 114 having an interior surface adapted to conform to the lower exterior surface of elongate tubular support 30 allowing said upper and lower clamps to be adjustably positioned along the elongate tubular support. As shown here by way of a specific example, upper clamp 112 and lower clamp 114 consist of a 2.75 inch long section of 2.5 inch inside diameter steel tube with a 0.065 inch wall thickness cut longitudinally in half and having four fastening means supports 115 consisting of four 5/16 inch wide by ¼ inch thick steel strips each 2.75 inches long welded along the outside of the longitudinal cut and drilled to accept fastening means 116. Lower clamp 114 has a 2.0 inch hole cut in the lower center portion. Lower clamp 114 rigidly supports front fork shell 118, which as illustrated here as a specific example, consists of 2.0 inch inside diameter tubular steel having a 0.065 inch wall thickness cut to a 2.0 inch section with two 2.625 inch notches cut into opposite sides of the top end of the fork shell to provide an intersection 117 with a weldable edge for attachment to lower clamp 114, the lower edge of fork shell being square cut relative to the longitudinal axis of the fork shell. Fork shell 118 pivotally supports the front fork assembly consisting of a crown tube 140 rigidly supporting fork crown 142 rigidly supporting respective conventional front bicycle forks 144 and 146 which rotatably support the front wheel. As shown here, fork shell 118 rigidly supports within its interior an interior bearing support 122 rigidly supporting respective outer bearing races 124 rotatably supporting bearings 126 best shown in FIG. 6. Bearings 126 rotatably support internal bearing races 128 attached to fork crown tube 140 by jam nut 152 and locking nut 154 threadably engaging the top portion of the crown tube rotatably supporting the fork crown within the fork shell. Crown tube 140 is rigidly attached to fork crown 142 by brazing or welding rigidly supporting respective left and right conventional front forks 144 and 146 having conventional wheel drop-outs 148 adapted to rotatably support front wheel 18 between the front forks. Conventional bicycle handbrake 150 and handbrake cable guides 151 may also be mounted on front fork 120 best shown in FIGS. 1 and 6.

Elongate tubular support 30 supports a seat 14 generally intermediate front wheel 18 and outer drive sprocket 22 adapted to support a rider, and also supports a steering assembly comprising handlebars rotatably supported by elongate tubular support 30 within the rider's reach and interconnected with front fork 120 for steerably controlling recumbent pedalable vehicle 10. To operate the recumbent pedalable vehicle the rider straddles the center portion 34 of the elongate tubular support with both feet on the ground and holding the handlebars while sitting in seat 14, places one foot on one of the foot pedals of crank assembly 38 while balancing the vehicle with the other foot still on the ground and rotates crank assembly 38 by pressing on the foot pedal while pushing off the ground with the other foot which is then placed on the other foot pedal.

Another important feature of the present invention includes a steering assembly 16 for a recumbent pedalable vehicle best shown in FIGS. 1, 2 and 4–6 consisting of a front fork 120 pivotably mounted on frame 12 and interconnected with a handlebar assembly 82 pivotably mounted on the frame by steering cables 84 and 86 in diametric contact with the front fork and respective sides of the handlebar assembly providing for transfer of steering power from movement of the handlebars to the front fork and to the front wheel. As illustrated here, best shown in FIG. 6, front fork 120 consists of the elements described above with the top portion of crown tube 140 also being threaded to receive a threaded jam nut 152 and threaded locking nut 154 adapted to securely fasten front fork steering cable support 156 to the crown tube, the crown tube having a key way 161 cut into one side and adapted to receive a key portion 163 rigidly attached to the interior of fork steering cable support 156, and one side of fork shell 118 having two slots 88 cut therein adapted to receive steering cables 84 and 86. Front fork steering cable support means 156 best shown in FIGS. 4 and 6, as illustrated here as a specific example, consists of a steering spool having an outer side surface 158 with two concentric grooves 160 and 162 about 0.08 inches wide cut into its outer surface adapted to receive steering cables 86 and 84, respectively, each steering cable having an outside diameter of about 0.062 inches. Steering cable support spool 156 may be constructed of steel, aluminum or brass or other hard material and, as illustrated here as a specific example, is constructed from a section of 2.0 inch outside diameter aluminum bar stock turned down to about 1.875 inches on a lathe, with a hole bored in the center to accommodate fork crown tube 140 and two concentric grooves cut about 0.08 inches wide into outer surface 158 about ⅛ inch apart and the spool cut away from the bar stock to provide a spool of about ¼ inch thickness. Key portion 163 is provided on the inner surface of the hole in spool 156 accommodating the crown fork tube by deforming the inner surface by swedging or by attaching a key portion to the inner surface. Top surface 170 of steering cable support spool 156 also has a groove 172 cut in the surface adapted to receive steering cable 86 connecting with hole 173 drilled through the cable support spool adapted to engage steering cable stop 174 attached to one end of steering cable 86 at a position approximately 180° opposite from the point at which steering cable 86 first contacts groove 160 when steering assembly 16 is in a non-turn position, allowing cable 86 to wrap around the steering cable support spool in contact with groove 160 to the point of diametric attachment of cable stop 174 to hole 173. Lower surface 180 of the steering cable support spool 156 similarly has a groove 182 cut into its surface adapted to receive steering cable 84 and interconnects groove 162 with hole 183 adapted to engage steering cable stop 184 attached to one end of the steering cable at a position substantially 180° opposite the point of attachment of cable 84 to hole 173 of steering cable support spool 156 and substantially 180° opposite to the point cable 84 first contacts the groove 162 in the non-turn position, allowing cable 84 to wrap around the steering cable spool in contact with groove 162 to the point of diametric attachment of cable stop 184 to hole 183. Grooves 172 and 182 may be cut into respective upper and lower surfaces by placing the spool in a milling machine and milling a groove in the upper surface, removing the cable support spool from the machine, turning it over to expose lower surface 180 and milling a similar groove at the same location on the milling pattern or by cutting grooves by other well-known means. Holes 173 and 183 may be drilled through the spool by employing a drill press or hand drill.

Handlebar assembly 82, best shown in FIGS. 1, 2 4 and 5, may be constructed of the same elements and in the same manner employed in construction of front fork assembly 120 with the exception that a handlebar gooseneck 192 is pivotably supported within handlebar shell 190. As illustrated here, handlebar assembly 82 consists of upper clamp 194 having an inner surface adapted to conform to the upper exterior surface of elongate tubular support 30 and adjustably fastenable by fastening bolts 196 supported by fastening supports 115 to lower clamp 198 having an interior surface adapted to conform to the lower exterior surface of elongate tubular support 30 allowing the upper and lower clamps to be adjustably positioned and securely fastened along the elongate tubular support at a desired position. Handlebar shell 190 rigidly supports bearing support portions 122 rigidly supporting external bearing races 124 rotatably supporting bearings 126 rotatably supporting inner bearing races 128 rigidly supported by handlebar crown tube 202 having a key way 161 and a threaded upper portion adapted to threadably engage jam nut 152 and lock nut 154 similar to that employed in supporting fork crown tube 140 except that the bottom portion of handlebar crown tube 202 is flared outward and, as a specific example illustrated here, a 2.0 inch outside diameter washer 200 is welded to the bottom of the crown tube above the flare to produce a cap for the bottom of handlebar shell 190, and handlebar steering cable support 204, as a specific example shown here, is attached to handlebar crown tube 202 at a position below the bearings instead of immediately below jam nut 152, it being understood that the handlebar steering cable support may be attached to the crown tube below the jam nut if desired. Handlebar shell 190 has two slots 240 cut in its side adapted to receive cables 84 and 86. Steering cable support 204, as a specific example shown here, consists of a steering cable support spool constructed in a manner and of the same material as front fork steering cable support spool 156 including having a hole cut in the center of the spool adapted to receive crown tube 202 and having its inner portion deformed to provide key way 205, and having two concentric circular grooves 206 and 208 about 0.08 inches wide cut into outer surface 210 of the cable support spool adapted to receive steering cable 86 and 84, respectively, best shown in FIGS. 4 and 5. Cable support spool 204 has a groove 214 cut in upper surface 212 connecting groove 206 with hole 216 drilled through the cable support spool and adapted to receive steering cable 86 at a position approximately 180° opposite the point steering cable 86 first contacts groove 206 when the handlebar is in a non-turn position, allowing the steering cable to wrap around steering spool 204 in contact with groove 206 and to extend downward through hole 216 and through corresponding hole 218 in washer 200 and engage cable stop 220, hole 216 being at a point diametrically opposite the point steering cable 86 first contacts groove 206 when the steering assembly is in a non-turn position. Steering cable 84 is received by groove 208, wraps around the cable support spool in contact with groove 208 until it reaches groove 224 cut in lower surface 222 of the cable support spool connects with hole 226 drilled through the cable support spool and located approximately 180° opposite the point cable 84 first contacts groove 208 when the handlebar is in a non-turn position and extends downward through hole 226 and corresponding hole 228 in washer 200 and engages cable stop 230. Cable stops 220 and 230 may include cable tensioner means adapted to tension steering cables 84 and 86 to provide adequate contact of the steering cables with the cable supports to provide adequate steering control. Handlebar gooseneck 192 is a conventional handlebar gooseneck including wedge portion 232 threadably engaging threaded member 234 threadably adjustably supporting gooseneck 192 rigidly supporting conventional handlebar 238. It is also contemplated that steering cables 84 and 86 may be replaced by a single cable interconnecting the front fork cable support and handlebar cable support both adapted to route the cable between the respective cable grooves in the spools providing the cable leaves its groove at a position substantially 180° opposite the point the cable first contacts the groove in a non-turn position. Cable spools 156 and 204 may be of different outer diameters to provide a steering ratio if desired.

Preferred recumbent vehicles including this feature of a steering assembly employing a steering cable means diametrically contacting and interconnecting the handlebar assembly and front fork have been found to provide nearly 90° turning of the front wheel, enhancing low speed maneuverability and providing a significant improvement over the tie-bar and non-diametric cable steering systems reported in the art which can only provide about a 45° turn of the front wheel as the cable or tie bar on opposite sides of the front fork and handlebars begin to oppose one another when a tighter turn is attempted.

Figures 7, 8, 9, 10:
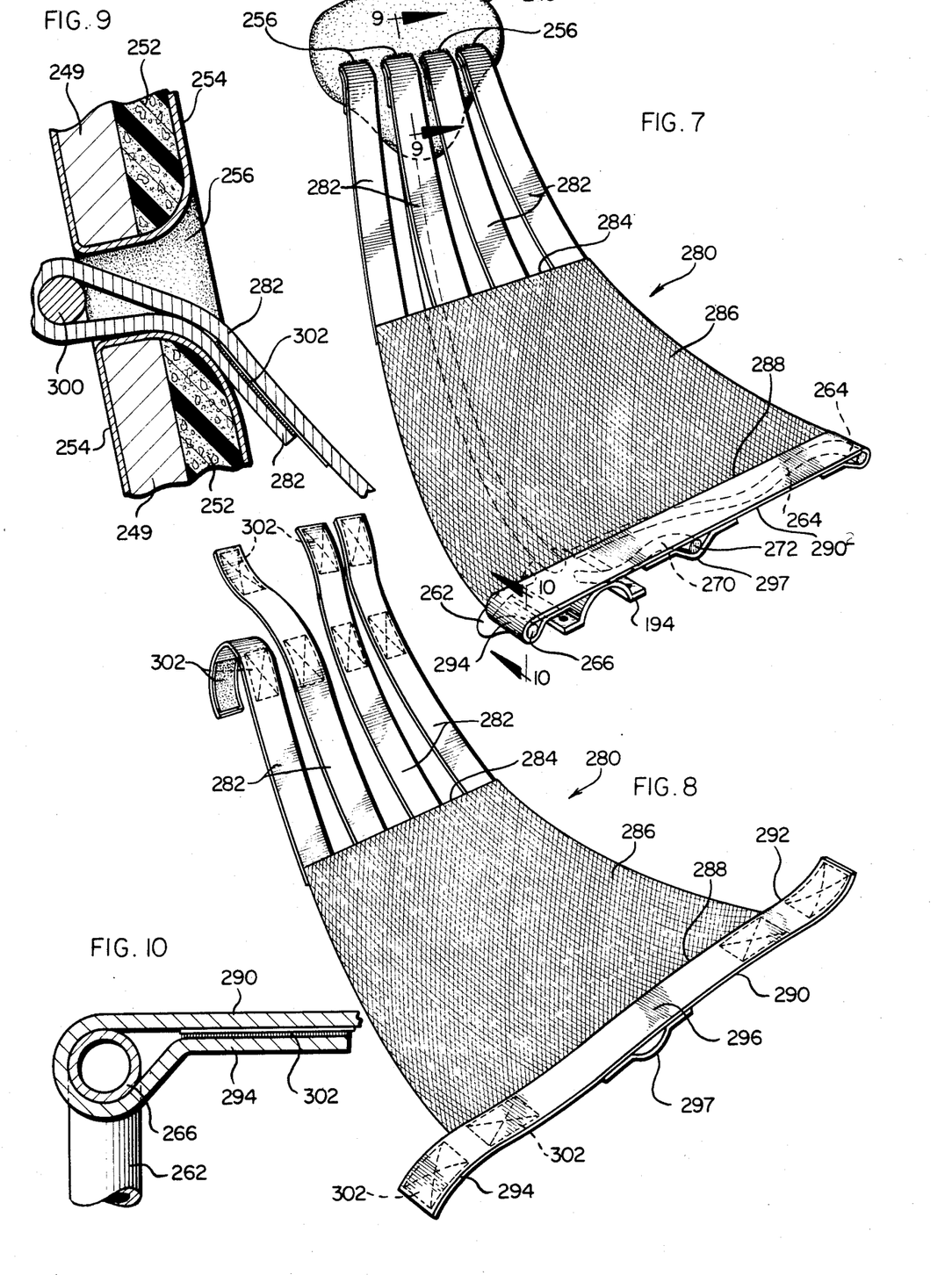
FIG. 7 is a fragmentary elevated perspective view of one embodiment of a recumbent pedalable vehicle seat according to the present invention.
FIG. 8 is a fragmentary elevated perspective view of the seat web of FIG. 7 removed from the seat web supports.
FIG. 9 is a sectional fragmentary side view of the seat backrest and rear seat web support taken along section line 9—9 of FIG. 7.
FIG. 10 is a sectional fragmentary side view of one seat side support taken along section line 10—10 of FIG. 7.
Figure 11:
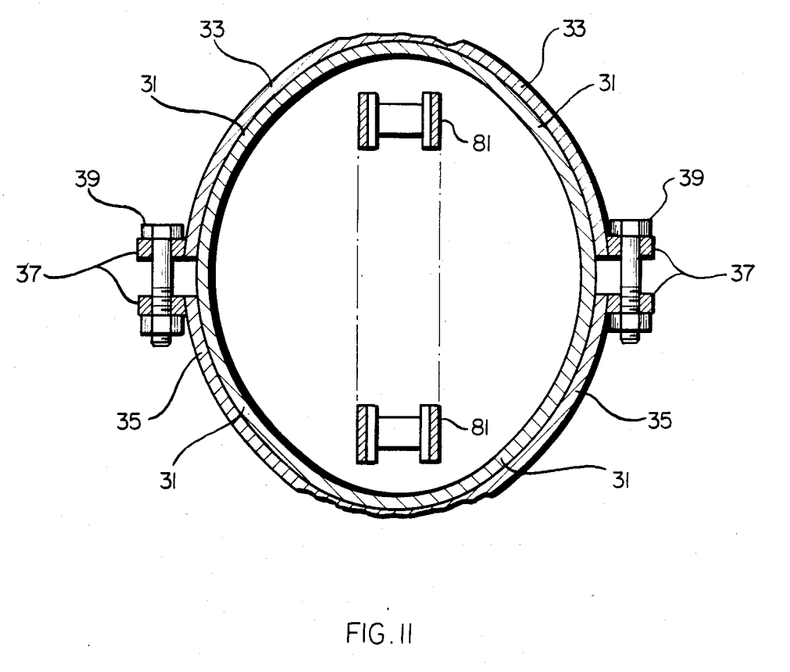
FIG. 11 is a fragmentary cross-sectional view of an elliptical tubular support in accordance with another embodiment of the present invention.

Another important feature of a preferred embodiment of the present invention includes a seat 14 supported on frame 12 generally intermediate outer drive sprocket 24 and front fork 120, seat 14 consisting of a seat fastening means selectively positionably fastenable along the frame and having a middle portion and side portions and as illustrated here, consists of upper clamp 194 of handlebar fastening means of handlebar assembly 82 having middle portion 240 and side portions 242 best shown in FIGS. 1–2. Middle portion 240 rigidly supports seat center support 244 having a backrest support portion 246 and a front seat web support portion 270 and, as illustrated here as a specific example, consist of a 22 inch section of steel pipe having a 1/16 inch wall thickness and a $\frac{3}{8}$ inch outside diameter bent into a reverse J shape curve with the lower portion of the J shape being adapted to conform with upper surface of middle portion 194 of the seat fastening means to provide a weldable intersection for welding seat center support 244 to the middle portion of the seat fastening means. Seat backrest support portion 246 supports near its upper end seat backrest 248 which is preferably swivelly supported by seat backrest swivel 250 selectively positionable along seat backrest portion 246 allowing adjustment of the height of the seat backrest relative to the frame to accommodate various size riders. Seat backrest 248 may be constructed of plastic, wood, metal or other strong material and padded for added comfort, and as illustrated here as a specific example best shown in FIGS. 1, 2, 7 and 9, consists of a rounded T-shape metal section 249 about 9 inches wide by 8 inches high cut from 0.035 sheet metal with foam padding 252 attached to the surface contacting the rider by padding cover 254. Seat backrest 248 also rigidly supports rear seat web supports 256 which, as illustrated here as a specific example, consists of a series of four horizontal $\frac{1}{8}$ inch by 1 inch slots 256 cut into seat backrest 248 about 1 inch below the point of attachment of seat backrest swivel. Seat side supports 260 and 262, best shown in FIGS. 1, 2 and 7 by way of a specific example, consist of a 24 inch section steel pipe having a wall thickness of 1/16 inch with $\frac{3}{8}$ inch outside diameter bent into a shallow U-shape curve of about a 6 inch depth, the U-shape being cut into two equal length sections with ends adapted to conform to side portions 242 of the seat fastening means to provide weldable edges and welding the edges to the side portions. Seat side supports 260 and 262 rigidly support at their other ends respective seat side web supports 264 and 266 which, as illustrated here, consist of bending the end portions into shallow S-shaped angled sections extending generally upward and forward generally parallel to front portion 270. Seat center support 270 rigidly supports center seat web support 272 consisting of a shallow S curve bent in the end of the seat center supporting and extending generally forward and upward from middle portion 240 and rigidly supports center seat web support 272 at about the same height above frame 12 as seat side web supports 260 and 262, it being understood that the height of the seat center support 272 may be adjusted to suit the comfort of the rider.

Seat web 280 is supported by rear seat web support 256, side seat web supports 264 and 266 and center seat web 272 and is adapted to securely support the rider in a recumbent position above frame 12. As illustrated here, seat web 280 consists of flexible rear seat web straps 282 having ends adapted to removably attach to rear seat web support 256 and having other ends integrally attached to the rear portion 284 of seat net 286 best shown in FIGS. 7 and 8. In the presently preferred embodiment, rear seat webs 282 are supported by the rear seat web supports by threading the rear seat web through slots 256 and around seat web stop 300 and back through slots 256 and attaching the end of the rear seat web to itself on the forward side of the slot with well-known fastening means 302 such as Velcro best shown in FIG. 9. Seat net 286 has attached to its front portion 288 a flexible front seat web strap 290 having front seat strap ends 292 and 294 adapted to removably attach to respective seat side supports 264 and 266, best shown in FIGS. 7, 8 and 10, and a center portion 296 adapted to removably attach to center seat support 272. Front seat strap ends may be removably attached to the side seat supports by wrapping the ends around respective side supports and attaching the end to itself on the lower inside portion of front seat web strap 290 by well-known fastening means 302 such as Velcro, best shown in FIG. 10. Center portion 296 of front seat web strap 290 may also be attached to center seat web support by pocket 297 formed by sewing a section of seat web strip to the lower portion of the front seat web to form a pocket.

Seat 14 supports a rider in a recumbent position above frame 12 at a location allowing easy access to handlebar assembly 82 and is positionably adjustable along elongate tubular support 30 relative to crank assembly 38 to accommodate different size riders. Rear seat webs 282 and front seat strap 290 are constructed of strong flexible material such as nylon seat belt straps and are integrally attached to seat net 286 which, as illustrated, consists of strong nylon mesh webbing such as laundry bag webbing by sewing or other means thereby producing a seat web 280 capable of withstanding and absorbing the torsion caused by the rider's movement of crank assembly 38 without the need for intricate seat back supports.

Another important feature of a presently preferred embodiment of the present invention includes a recumbent vehicle 10 having a combination of an elongate tubular support 30 substantially entirely enclosing primary drive means 80 and steering assembly 16 including steering cables 84 and 86 diametrically interconnecting front fork 120 and handlebar assembly 82. This preferred embodiment of a pedalable recumbent vehicle thus provides a vehicle wherein the risk of rider entanglement with power transfer means is eliminated and provides increased front wheel steering rotation to about 90° to each side thereby enhancing low speed maneuverability relative to the reported recumbent vehicles. Front wheel 18 is also selectively positionable along elongate tubular support 30 allowing adjustment of the vehicle's wheel base to provide enhanced maneuverability or stability.

Another feature of a presently preferred embodiment according to the present invention includes a recumbent vehicle 10 having the combination of seat assembly 14 and handlebar assembly 82 attached to the same fastening means adapted to selectively positionably attach to elongate tubular support 30 which substantially entirely encloses primary drive means 80. This preferred embodiment includes seat 14 having rear seat web support 246, side seat supports 262 and 264 and center seat web support portion 270 attached to the upper surface of the fastening means which lower surface supports handlebar assembly 82, allowing the seat and handlebars to be positioned at any location along elongate tubular support 30 so as to accommodate any size rider in contrast to the seat and/or handlebar assemblies reported in the art, as well as providing the other advantages of elimination of the risk of rider entanglement and improved maneuverability mentioned above.

Numerous modifications and variations of the invention as illustrated above and in the drawings are expected to occur to those skilled in the art. Consequently, only those limitations that appear in the appended claims should be placed on the invention as above described.

What is claimed is:

1. In a vehicle adapted to be operated by a rider in a recumbent position, including a frame having a front portion and a rear portion, a crank assembly including foot pedals supported on the front portion of the frame, a front wheel support pivotably attached to the frame intermediate the front portion and the rear portion of the frame and rotatably supporting a front wheel, a rear wheel rotatably supported by the rear portion of the frame including a rear wheel axle rigidly supporting a rear wheel sprocket, a seat supported on the frame generally intermediate the front wheel support and the rear wheel, and a steering means including a handlebar pivotably supported on the frame generally adjacent the seat and interconnected with the front wheel support, the improvement wherein said frame comprises:

an elongated tubular support means having a front portion rotatably supporting said crank assembly, a center portion supporting said seat and a rear portion rotatably supporting said rear wheel, said elongate tubular support means being adapted to substantially entirely enclose within its interior a primary drive means comprising a crank sprocket means rigidly supported by said crank assembly and interconnected by a power transfer means to an inner drive sprocket means rigidly supported by a drive shaft means interconnected by a secondary drive means to said rear wheel, said primary drive means providing for transfer of power supplied from rotation of said crank assembly from said crank sprocket to said inner drive sprocket and to said secondary drive means and to said rear wheel.

2. A vehicle according to claim 1 wherein said elongate tubular support means comprises an elongate elliptical tubular support means.

3. A vehicle according to claim 1 wherein said elongate tubular support means comprises an elongate circular tubular support means.

4. A vehicle according to claim 3 wherein said elongate circular tubular support means comprises a circular tubular support means of substantially uniform outside diameter.

5. A vehicle according to claim 1 wherein said secondary drive means comprises a bicycle chain drive comprising an outer drive sprocket rigidly supported by said drive shaft at a position outside said rear portion of said elongate tubular support and interconnected by a chain drive to said rear sprocket supported by said rear wheel axle.

6. A vehicle according to claim 1 wherein said crank assembly comprises a crank shaft means having a center sprocket means support portion, intermediate bearing support portions and outer crank support portions, said crank shaft means rotatably horizontally supported at its intermediate bearing support portions by opposite sides of said front portion providing for rotatable support of said center sprocket support portion within said front portion of said elongate tubular support means substantially horizontally perpendicular to the interior longitudinal axis of said elongate tubular support means, crank means rigidly attached to said outer crank support portions of said crank shaft means external to said elongate tubular support means and rotatably supporting foot pedal means, said crank sprocket means of said primary drive means rigidly attached to said center sprocket support portion of said crank shaft means at a position inside said front portion of said tubular support means and in substantial longitudinal alignment with said longitudinal axis of said elongate tubular support means.

7. A vehicle according to claim 6 wherein said front portion rotatably supporting said crank shaft at said bearing portions comprises bearing means supported by said front portion.

8. A vehicle according to claim 1 wherein said drive shaft means comprises a drive shaft having a center inner drive sprocket support portion, intermediate bearing support portions and outer support portions, said drive shaft means rotatably horizontally supported at said bearing support portions by opposite sides of said rear portion providing for rotatable support of said center inner drive sprocket support portion within said rear portion of said elongate tubular support means substantially horizontally perpendicular to the interior longitudinal axis of said elongate tubular support means and substantially parallel to said crank shaft means, one of said outer support portions interconnected by said secondary drive means to said rear wheel, and said inner drive sprocket means of said primary drive means rigidly attached to said center inner drive sprocket support portion of said drive shaft means at a position inside said rear portion of said elongate tubular support means and in substantial longitudinal alignment with said longitudinal axis of said tubular support means.

9. A vehicle according to claim 8 wherein said rear portion rotatably supporting said drive shaft means comprises bearing means rigidly supported by said rear portion.

10. A vehicle according to claim 9 wherein said bearing means comprise bearings rotatably supported by respective bearing caps.

11. A vehicle according to claim 10 wherein said bearing caps comprise bearing caps adapted to eccentrically rotatably support said drive shaft and rotatable to provide tension to said power transfer means interconnecting said crank sprocket and said inner drive sprocket.

12. A vehicle according to claim 1 wherein said steering means comprises
- a front wheel support means comprising a front wheel support fastening means adapted to selectively rigidly attach to said frame at a position generally intermediate said front portion and said rear portion, said front wheel support fastening means pivotably supporting a front fork assembly means having an upper bearing support portion, a center steering cable support means support portion and lower fork members, said lower fork members rotatably supporting said front wheel;
- a handlebar means comprising a handlebar fastening means adapted to selectively rigidly attach to said frame at a position generally intermediate said front wheel support means and said rear portion of said frame, said handlebar fastening means pivotably supporting a handlebar shaft means having an upper bearing support portion, a center steering cable support means support portion, and a lower handlebar support portion rigidly supporting a handlebar;
- a front fork steering cable support means rigidly attached to said center steering cable support means support portion of said front fork assembly and adapted to maintain a steering cable means at a first steering position and a second steering position;
- a handlebar steering cable support means rigidly attached to said center steering cable support means support portion of said handlebar shaft means and adapted to maintain a steering cable at a first steering position and a second steering position;
- said front fork steering cable support means and said handlebar steering cable support means being adapted to maintain said steering cable means at said first steering position allowing for diametric contact of said steering cable with said front fork steering cable support means and with said handlebar steering cable support means, and being adapted to maintain said steering cable at said second steering position allowing for complementary diametric contact of said steering cable with said front fork steering cable support means and said handlebar steering cable support means; and
- a steering cable means diametrically contacting said front fork steering cable support means and said handlebar steering cable support means at said first steering position and complementarily diametrically contacting said front fork steering cable support means and said handlebar steering cable support means at said second steering position when said steering assembly is in a non-turn position, providing for transfer of steering power provided from steering movement of said handlebars to said front fork assembly and to said front wheel.

13. A vehicle according to claim 12 wherein said steering cable means comprises a first steering cable means diametrically contacting said front fork steering cable support means and said handlebar steering cable support means at said first steering position and a second steering cable means complementarily diametrically contacting said front fork steering cable support means and said handlebar steering cable support means at said second steering position when said steering assembly is in a non-turn position.

14. A vehicle according to claim 12 wherein said front wheel support fastening means comprises a clamping means adapted to selectively positionably rigidly attach to said frame.

15. A vehicle according to claim 14 wherein said clamping means comprises a lower clamping means and an upper clamping means having interior surfaces adapted to substantially conform to the outer surface of said frame and adjustably rigidly fastenable to one another to selectively positionably rigidly attach around said frame.

16. A vehicle according to claim 12 wherein said handlebar fastening means comprises a clamping means adapted to selectively positionably rigidly attach to said frame.

17. A vehicle according to claim 16 wherein said clamping means comprises a lower clamping means and an upper clamping means having interior surfaces adapted to substantially conform to the outer surface of said frame and adjustably rigidly fastenable to one another to selectively positionably rigidly attach around said frame.

18. A vehicle according to claim 1 wherein said seat comprises
- a seat fastening means having a front portion, opposite side portions and rear portions and adapted to selectively positionably rigidly attach to said frame at positions generally intermediate said front wheel support and said rear portion of said frame,
- a seat backrest support means rigidly attached by one end to said rear portion of said seat fastening means and extending generally rearward and upward from said seat fastening means and rigidly at its other end a seat backrest means rigidly supporting a rear seat web support means,
- seat side support means rigidly attached by respective first ends to said opposite side portions of said seat fastening means and extending generally sideways and upward from said seat fastening means and supporting at their respective other ends side seat web support means,
- a seat center support means rigidly attached by one end to said front portion of said seat fastening means and extending generally forward upward from said seat fastening means and rigidly supporting at its other end a center seat web support means,
- a seat web means comprising a front seat web portion, a center seat web portion, side seat web portions and a rear seat web portion, said front seat web portion being adapted to attach to said center seat web support means, said side seat web portions being adapted to attach to said side seat web support means, and said rear seat web portion being adapted to attach to said rear seat web support means, said seat web means adapted to securely support said rider above said frame.

19. A vehicle according to claim 12 wherein said seat comprises
- a seat fastening means having a front portion, opposite side portions and rear portions and adapted to selectively positionably rigidly attach to said frame at positions generally intermediate said front wheel support and said rear portion of said frame, a seat backrest support means rigidly attached by one end to said rear portion of said seat fastening means and extending generally rearward and upward from said seat fastening means and rigidly at its other end a seat backrest means rigidly supporting a rear seat web support means, seat side support means rigidly attached by respective first ends to said opposite side portions of said seat fastening means and extending generally sideways and upward from said seat fastening means and supporting at their respective other ends side seat web support means, a seat center support means rigidly attached by one end to said front portion of said seat fastening means and extending generally forward upward from said seat fastening means and rigidly supporting at its other end a center seat web support means, a seat web means comprising a front seat web portion, a center seat web portion, side seat web portions and a rear seat web portion, said front seat web portion being adapted to attach to said center seat web support means, said side seat web portions being adapted to attach to said side seat web support means, and said rear seat web portion being adapted to attach to said rear seat web support means, said seat web means adapted to securely support said rider above said frame.

* * * * *